United States Patent
Chen et al.

(10) Patent No.: US 9,003,658 B2
(45) Date of Patent: Apr. 14, 2015

(54) METHOD FOR ENCLOSING HEAT PIPE WITH METAL AND COMPOSITE HEAT PIPE THEREOF

(75) Inventors: Chang-Yin Chen, New Taipei (TW); Lei-Lei Liu, Hui Zhou (CN)

(73) Assignee: Cooler Master Development Corporation, New Taipei (TW)

( * ) Notice: Subject to any disclaimer, the term of this patent is extended or adjusted under 35 U.S.C. 154(b) by 617 days.

(21) Appl. No.: 13/314,181

(22) Filed: Dec. 8, 2011

(65) Prior Publication Data

US 2012/0175097 A1    Jul. 12, 2012

(30) Foreign Application Priority Data

Jan. 11, 2011 (TW) .............................. 100100880 A

(51) Int. Cl.
  *B21D 53/06* (2006.01)
  *B21D 39/04* (2006.01)
  *B21D 41/04* (2006.01)
  *B23P 11/00* (2006.01)
  *F28D 15/02* (2006.01)

(52) U.S. Cl.
  CPC ............... B21D 39/04 (2013.01); B21D 41/04 (2013.01); B21D 53/06 (2013.01); B23P 11/005 (2013.01); *B23P 2700/09* (2013.01); *F28D 15/02* (2013.01)

(58) Field of Classification Search
  CPC ........ B21D 39/04; B21D 41/04; B21D 53/02; B21D 53/06; B22D 17/00; B22D 19/00; B22D 19/0081; B22D 19/0072; B23P 11/00; B23P 11/005; B23P 2700/091; F28D 15/04
  USPC ........ 29/890.03, 890.032, 890.036; 164/112; 165/104.26, 104.33; 361/700
  See application file for complete search history.

(56) References Cited

U.S. PATENT DOCUMENTS

| | | | |
|---|---|---|---|
| 8,656,590 B2 * | 2/2014 | Zhang et al. | 29/890.043 |
| 2010/0230082 A1 * | 9/2010 | Patel et al. | 165/177 |
| 2012/0227935 A1 * | 9/2012 | Huang | 165/104.26 |
| 2013/0048247 A1 * | 2/2013 | Lin et al. | 165/104.26 |
| 2013/0048248 A1 * | 2/2013 | Lin et al. | 165/104.26 |
| 2013/0145793 A1 * | 6/2013 | Dong et al. | 62/524 |
| 2013/0175007 A1 * | 7/2013 | Lin et al. | 165/104.26 |
| 2013/0180688 A1 * | 7/2013 | Lin et al. | 165/104.26 |
| 2014/0150263 A1 * | 6/2014 | Wu | 29/890.032 |
| 2014/0230248 A1 * | 8/2014 | Wang et al. | 29/890.032 |

FOREIGN PATENT DOCUMENTS

TW    M345223 U    11/2008

* cited by examiner

*Primary Examiner* — Alexander P Taousakis
(74) *Attorney, Agent, or Firm* — Chun-Ming Shih; HDLS IPR Services

(57) ABSTRACT

A method for enclosing a heat pipe with metal is disclosed. The method includes the steps of: a) providing a tube made of a metal; b) putting the heat pipe in a hollow of the tube; and c) stretching the tube to shrink an inner diameter of the tube for tightly enclosing the heat pipe.

3 Claims, 8 Drawing Sheets

METHOD FOR ENCLOSING HEAT PIPE WITH METAL AND COMPOSITE HEAT PIPE THEREOF

BACKGROUND OF THE INVENTION

1. Technical Field

The invention relates manufacture of a heat pipe, particularly to methods for enclosing the heat pipe with metal.

2. Related Art

Taiwan patent No. M345223 discloses an enclosure type flat heat pipe, which includes a flat heat pipe with an evaporation end and a condensation end and a metal sleeve. The sleeve tightly encloses the flat heat pipe with exposing the evaporation end. The exposed evaporation end is attached on a heat source. Thus the enclosure type flat heat pipe can be used for transferring heat from the heat source.

TW'223 is manufactured by the method including the steps of:

S1) providing a flat heat pipe with an evaporation end and a condensation end;

S2) freezing the flat heat pipe to shrink its volume;

S3) providing a sleeve made of aluminum, aluminum-magnesium alloy or titanium;

S4) heating up the sleeve to enlarge its inner diameter; and

S5) placing the frozen flat heat pipe in the heated sleeve and then waiting for cool-down.

By means of thermal expansion and contraction, the flat heat pipe will be tightly enclosed by the sleeve at the room temperature. Such a manufacturing method not only requires a heater and a freezer, but also a long time for cool-down must be waited. Thus it is so uneconomical in cost and time.

SUMMARY OF THE INVENTION

An object of the invention is to provide a method for enclosing heat pipe with metal, which does not require any heater or freezer and can shorten the manufacturing time without waiting for cool-down because the invention can be performed at a room temperature.

To accomplish the above object, the method for enclosing a heat pipe with metal of the invention includes the steps of: a) providing a tube made of a metal; b) putting the heat pipe in a hollow of the tube; and c) stretching the tube to shrink an inner diameter of the tube for tightly enclosing the heat pipe.

DETAILED DESCRIPTION OF THE INVENTION

[Embodiment 1]

Figure 1:
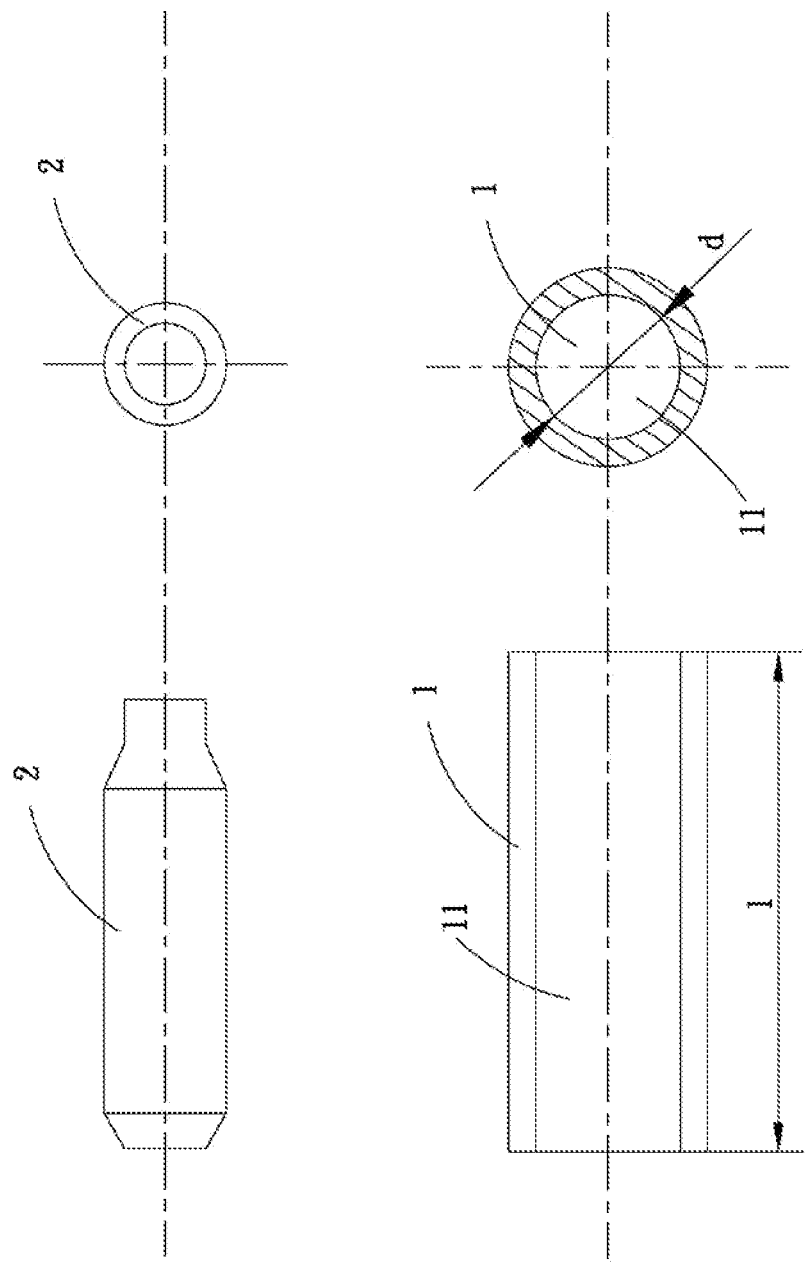
FIG. 1 is a schematic view of the heat pipe and tube of the invention.
Figure 2:
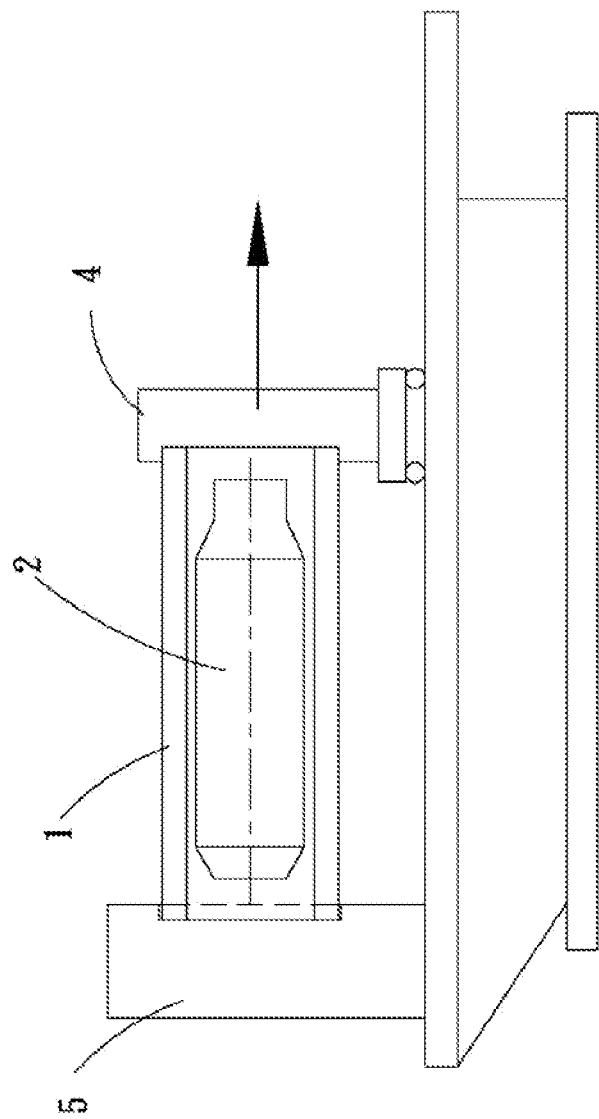
FIG. 2 illustrating the stretching step of the embodiment 1 of the invention.
Figure 3:
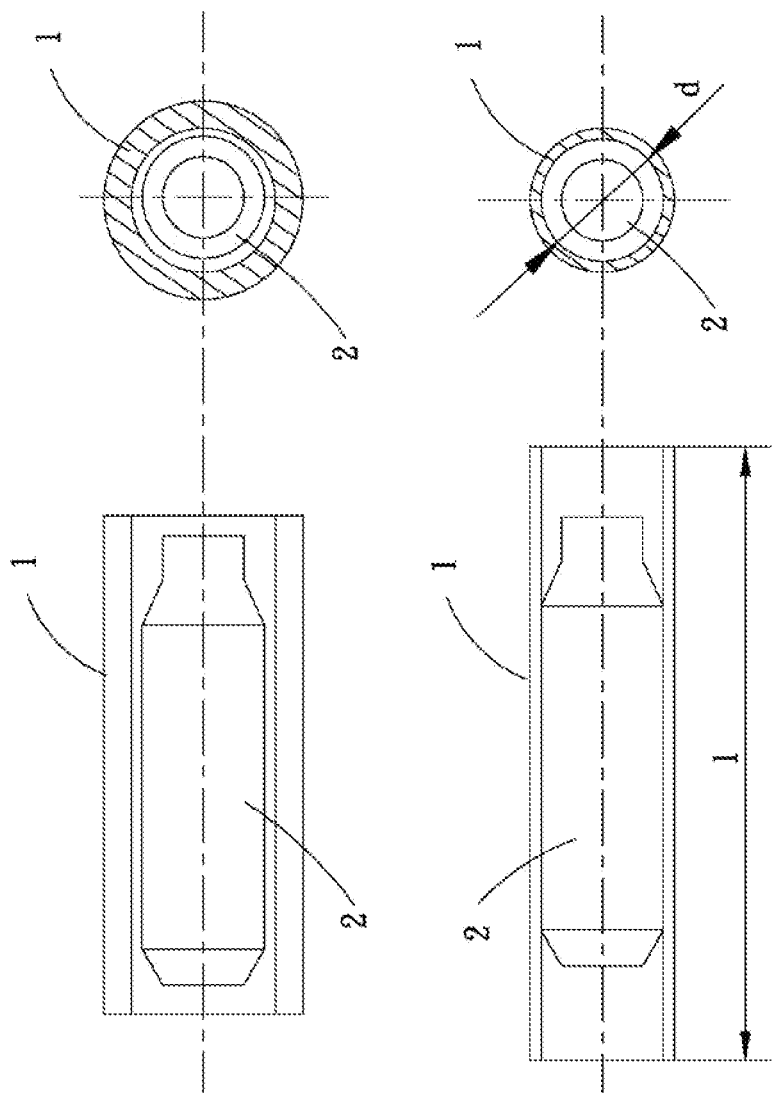
FIG. 3 illustrating the heat pipe and tube before and after the stretching step.
Figure 4:
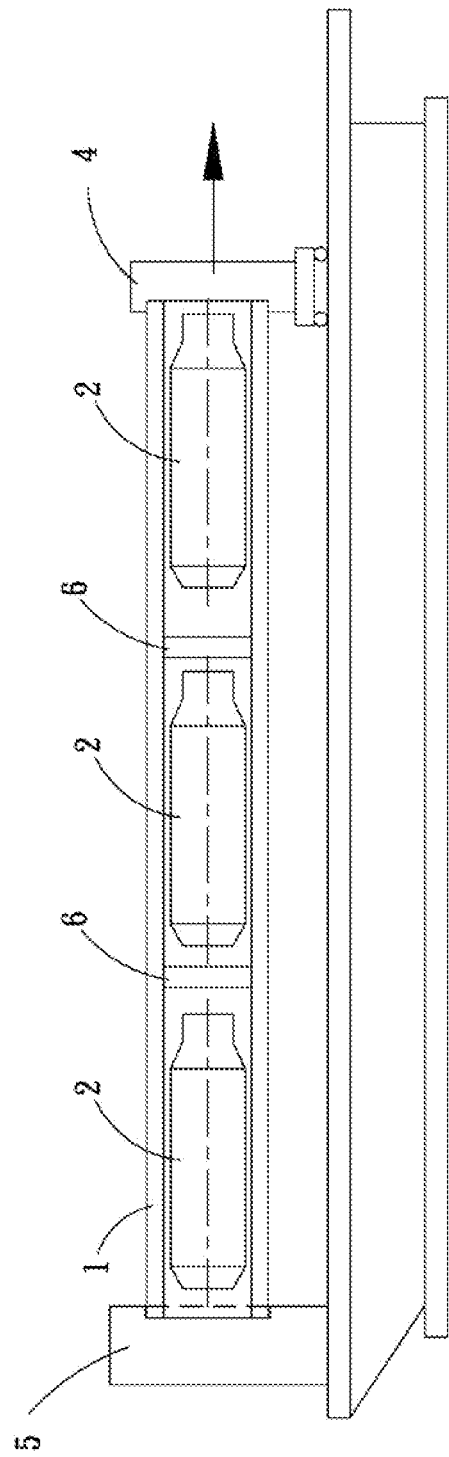
FIG. 4 illustrating the stretching step of the embodiment 2 of the invention.
Figure 5:
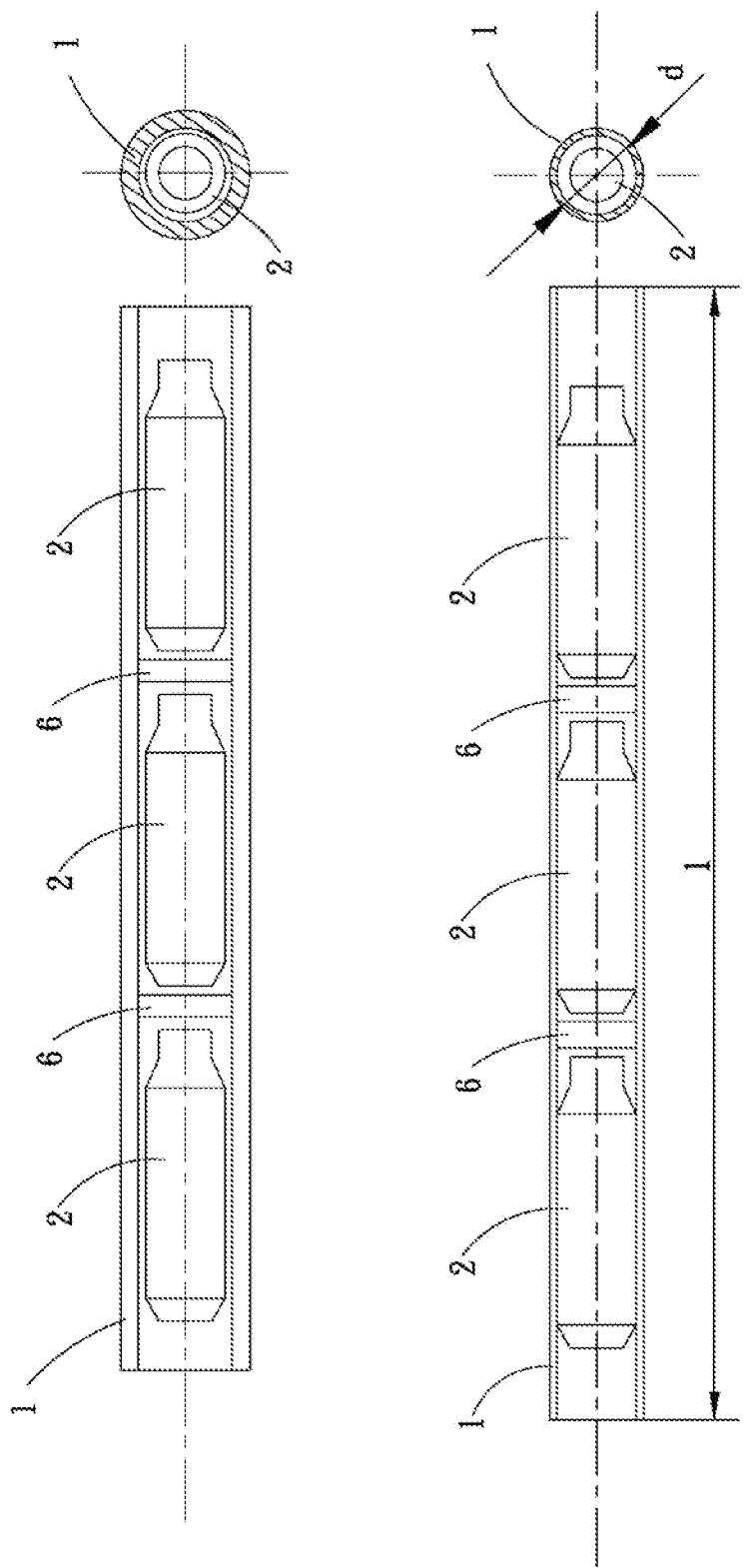
FIG. 5 illustrating the heat pipe and tube before and after the stretching step.
Figure 6:
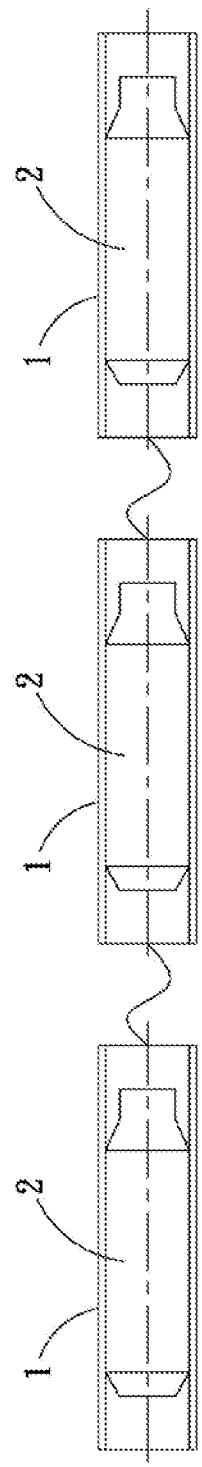
FIG. 6 illustrating the cutting step.
Figure 7:
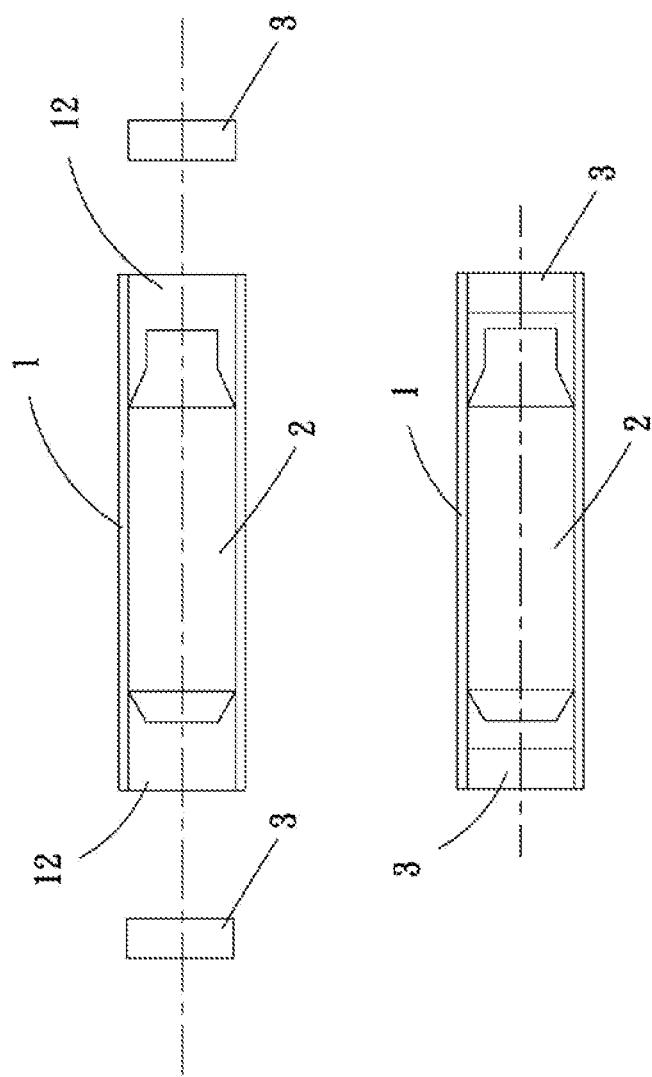
FIG. 7 illustrating the sealing step.

Please refer to FIGS. 1, 2, 3 and 7. The method of the invention includes the steps of:

a) providing a tube 1 made of a metal;

b) putting a heat pipe 2 in a hollow 11 of the tube 1; and c) stretching the tube 1 to shrink an inner diameter thereof for tightly enclosing the heat pipe 2.

In step c), two ends of the tube 1 are fastened on a fixed seat 4 and a movable seat 5 respectively. The tube 1 is stretched by moving the movable seat 5 outwards so that the length l of the tube 1 can be elongated and the inner diameter d can be shrunk. As a result, the heat pipe 2 can be tightly enclosed by the tube 1.

After step c), the heat pipe 2 with the tube 1 is removed from the seats 4 and 5 to be performed with a sealing step. In the sealing step, each end of the tube 1 is bunged with a metal plug 3. Accordingly, the heat pipe 2 is completely enclosed by metal material.

The tube 1 and metal plugs 3 may be made of aluminum.

[Embodiment 2]

Please refer to FIGS. 1, 4, 5 6 and 7. The method for enclosing a plurality of heat pipes with metal includes the steps of:

a) providing a tube 1 made of a metal;

b) putting a plurality of heat pipes 2 in a hollow 11 of the tube 1, wherein a spacer 6 is placed between every two adjacent ones of the plurality of heat pipes 2; and c) stretching the tube 1 to shrink an inner diameter of the tube 1 for tightly enclosing the plurality of heat pipes 2.

In step c), two ends of the tube 1 are fastened on a fixed seat 4 and a movable seat 5 respectively. The tube 1 is stretched by moving the movable seat 5 outwards so that the length l of the tube 1 can be elongated and the inner diameter d can be shrunk. As a result, the heat pipe 2 can be tightly enclosed by the tube 1.

After step c), the tube 1 containing a plurality of heat pipes 2 is removed from the seats 4 and 5 to be performed with a cutting step. In the cutting step, the tube 1 is divided into multiple sections, and each the section includes at least one heat pipe 2. Thus a plurality of tubes 1 enclosing heat pipe 2 are obtained After the cutting step, the heat pipe 2 with the tube 1 is performed with a sealing step. In the sealing step, each end of the tube 1 is bunged with a metal plug 3. Accordingly, the heat pipe 2 is completely enclosed by metal material.

The tube 1 and metal plugs 3 may be made of aluminum.

[Embodiment 3]

Figure 8:
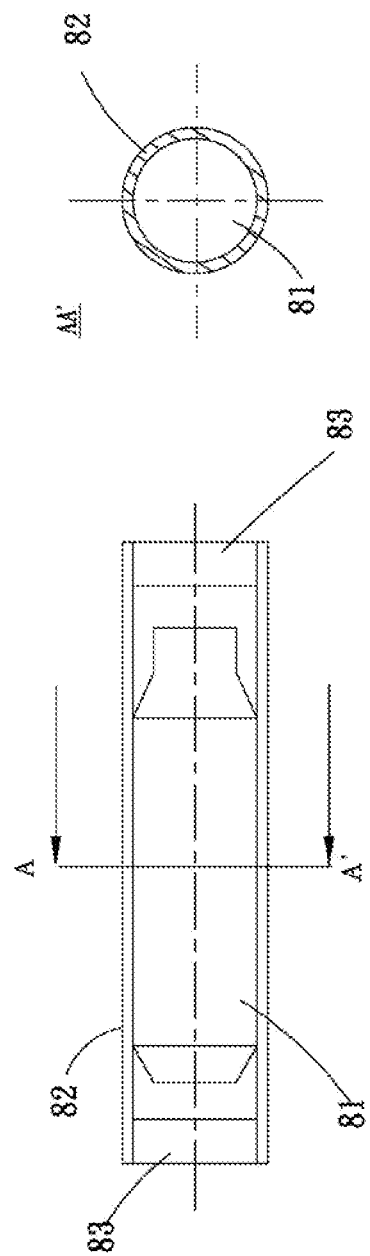
FIG. 8 illustrating the composite heat pipe of the invention.

Please refer to FIG. 8. A heat pipe manufactured by the above method includes a heat pipe 81; and a metal sleeve 82 tightly enclosing the heat pipe 81. each end of the heat pipe 81 is bunged with a metal plug 83. The metal sleeve 82 is made of aluminum.

It will be appreciated by persons skilled in the art that the above embodiments have been described by way of example only and not in any limitative sense, and that various alterations and modifications are possible without departure from the scope of the invention as defined by the appended claims.

What is claimed is:

1. A method for enclosing a heat pipe with metal, comprising the steps of:

a) providing a tube made of a metal;

b) putting the heat pipe in a hollow of the tube; and c) stretching the tube to shrink an inner diameter of the tube for tightly enclosing the heat pipe.

2. The method of claim 1, further comprising the step of:

d) bunging an end of the tube with a metal plug after step c).

3. The method of claim 1, wherein the metal is aluminum.

* * * * *